Feb. 14, 1956 F. M. MAYES 2,734,682
METHOD FOR LEAST SQUARES ADJUSTMENT OF SURVEY NETS
Original Filed July 18, 1950

INVENTOR.
FRED M. MAYES
BY
ATTORNEYS.

United States Patent Office 2,734,682
Patented Feb. 14, 1956

2,734,682

METHOD FOR LEAST SQUARES ADJUSTMENT OF SURVEY NETS

Fred M. Mayes, Newtown Square, Pa., assignor to Sun Oil Company, Philadelphia, Pa., a corporation of New Jersey Continuation of application Serial No. 174,512, July 18, 1950. This application August 19, 1954, Serial No. 450,923

2 Claims. (Cl. 235—61)

This invention relates to a method and apparatus for least squares adjustment of survey nets by the use of an electrical network analogue. While reference is herein principally made to elevational survey nets, it will be evident hereafter that the method and apparatus are also useful for the solution of analogous problems involving the same methematical considerations such as horizontal surveys, gravity surveys, etc.

This application is a continuation of application Serial Number 174,512, filed July 18, 1950, now abandoned.

In an article by Julius L. Speert in the Transactions of the American Geophysical Union, volume 28, Number 6, page 831, December 1947, there is discussed a method of survey-net adjustment by the use of electrical analogues. It is there shown that a least squares adjustment may be made by the measurements of potentials of junction points of an electrical resistive network in which the junction points correspond to the junctions of the lines of a survey net, in which the resistance of each branch of the electrical network is proportional to the length of a corresponding survey line, and in which each branch contains a potential source proportional to the algebraic sum of closures for opposite directions of measurement of a line to which the branch of the electrical network corresponds.

The apparatus discussed in this article is quite satisfactory for relatively simple net problems, but in more complicated nets difficulties arise due to the necessity for providing sources of potential, such as batteries, in series with the individual lines of the analogues. The use of many batteries is a nuisance and it is very difficult to maintain their characteristics to the desired degree of precision. On the other hand, it is expensive to substitute for the batteries regulated power supplies in view of the large number of these required in any reasonably complex system since there must be a separate power supply for each line of the net.

It is the broad object of the present invention to replace the type of analogue network suggested in said article by a type of network which is simpler to handle particularly in analyzing complex systems.

The foregoing general object and other subsidiary objects particularly relating to details of the method and apparatus will become apparent from the following description read in conjunction with the accompanying drawing, in which.

Figure 1:
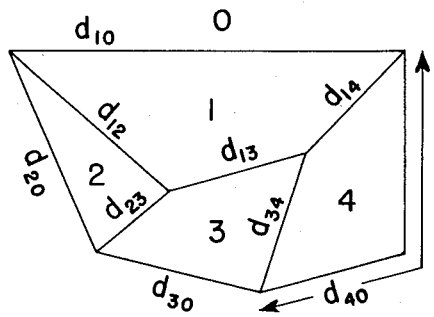
Figure 1 is a diagram of a simple survey net referred to hereafter, this simple net being illustrative of more complex nets such as would usually be encountered in practice.

Consider the survey net of Figure 1, which for simplicity is shown as containing four meshes (in the usual sense), though it will be evident that the following will apply generally to nets of any type provided bench marks, assumed of exactly known elevations, do not occur within the boundary of the mesh in such fashion that any line connecting them must intersect one of the survey lines at a point other than another bench mark. (The case involving such bench marks will be considered later.) Let these meshes be numbered 1, 2, 3, 4, etc., as indicated and let 0 refer to the external region outside the net which must also be considered for analysis a mesh of the net. Let a subscript $pq$ apply to a line of the net common to meshes $p$ and $q$, the subscript $po$ applying to a line which may be regarded as common to a mesh $p$ and the external, 0, mesh region.

Let $Y_{pq}$ be the measured change of elevation along a line common to meshes $p$ and $q$ taken in a direction clockwise about mesh $p$. Let $C_{pq}$ be the correction to be determined to be applied to the measurement $Y_{pq}$. And let $W_{pq}$ be the weight to be given to the correction $C_{pq}$ which may be regarded as the same as the weight ascribed to the measurement $Y_{pq}$. (It may be here noted that definitions here and hereafter referring to the subscripts $pq$ similarly apply to expressions bearing the subscripts $po$.)

It may be shown that, in accordance with the method of least squares, the corrections will be given by the condition that the following expression shall be a minimum:

(1) $$\sum_{p} W_{po} \cdot C_{po}^2 + \sum_{p,q} W_{pq} \cdot C_{pq}^2$$

subjects to the condition:

(2) $$C_{po} + \sum_{q} C_{pq} = -(Y_{po} + \sum_{q} Y_{pq})$$

for each mesh $p$.

(In the foregoing $$\sum_{p,q}$$

indicates summation over all of the combinations of $p$ and $q$, each combination being taken only once, while $$\sum_{q}$$

indicates summation, for each of the values of $p$, of all $q$'s having a line in common with $p$.)

In view of the electrical analogue to be adopted, let $C_{pq} = S_{pq} \cdot d_{pq}$, in which $d_{pq}$ is the length of the line common to meshes $p$ and $q$, and in which $S_{pq}$ may be called a "specific correction," i. e., the correction along the line $pq$ per unit length of the line.

Also let $$W_{pq} = \frac{1}{d_{pq}}$$

Generally this will be the case, the weight to be ascribed to a measurement or correction being inversely proportional to the length of the line. But if the weight to be ascribed to a measurement is not to be regarded as inversely proportional to the length of the line along which it is made, $d_{pq}$ may be considered as no more than the reciprocal of the weight by definition, with a corresponding definition, then, of $S_{pq}$. For consistency, however, in the description $d_{pq}$ will hereafter be referred to as a line length, with the understanding that it may have the more general significance last indicated.

Then (1) and (2) become, respectively, (1a) and (2a) as follows:

(1a) $$\sum_{p} S_{po}^2 \cdot d_{po} + \sum_{p,q} S_{pq}^2 \cdot d_{pq}$$

$$(2a) \quad S_{po} \cdot d_{po} + \sum_q S_{pq} \cdot d_{pq} = -\left(Y_{po} + \sum_q Y_{pq}\right)$$

Obviously the minimizing of (1) corresponds to the minimizing of (1a).

Attention may be called to the significance of the quantity $$Y_{po} + \sum_q Y_{pq}$$

appearing in (2) and (2a). This is, obviously, the "closure" of the measurements taken about a mesh $p$, i. e., the cumulative errors of the measurements.

It will be evident that the minimizing of the expression (1a) consistent with the conditions expressed by (2a) may be effected to give the values of the specific corrections by measurements if there can be provided an electrical network having properties expressed by the equivalents of (1a) and (2a). It will now be shown that such a network may be provided and measured.

Figure 2:
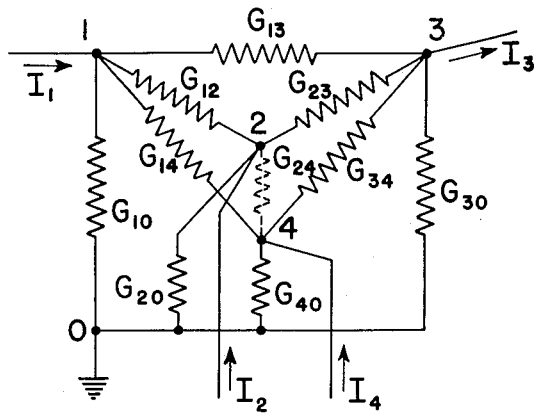
Figure 2 is an electrical diagram indicating the nature of an analogue of the survey net shown in Figure 1.

Consider the electrical resistance network shown in Figure 2 in which junctions are numbered 0, 1, 2, 3 and 4 to correspond with the meshes in Figure 1 including that corresponding to the exterior region, 0 of the net. Let $R_{pq}$ be the resistance directly connected between junctions $p$ and $q$, let $I_{pq}$ be the current flowing through resistance $R_{pq}$ in the direction from $p$ to $q$, and let $I_{po}$ be a current introduced at each junction $p$ and flowing through grounded junction 0 from the network.

A well-known network theorem states that when steady currents flow through a network of conductors in which no discontinuities of potential occur, the currents are distributed in such a way that the rate of generation of heat in the network is a minimum, subject only to the conditions imposed by Kirchoff's first law. (Jeans, Electricity and Magnetism, fifth edition, p. 322.)

Expressed mathematically for a network such as that of Figure 2, this theorem requires $$(3) \quad \sum_p R_{po} \cdot I_{po}^2 + \sum_{p,q} R_{pq} \cdot I_{pq}^2$$

to be a minimum, subject to:

$$(4) \quad I_{po} + \sum_q I_{pq} = I_p$$

for each junction.

Let a conductance $$G_{pq} = \frac{1}{R_{pq}}$$

so that $$I_{pq} = V_{pq} \cdot G_{pq}$$

$V_{pq}$ then being the potential change from $p$ to $q$.

Then (3) and (4) become respectively (3a) and (4a) as follows:

$$(3a) \quad \sum_p V_{po}^2 \cdot G_{po} + \sum_{p,q} V_{pq}^2 \cdot G_{pq}$$

$$(4a) \quad V_{po} \cdot G_{po} + \sum_q V_{pq} \cdot G_{pq} = I_p$$

Minimizing of (3) obviously corresponds to minimizing of (3a).

Comparison of (3a) and (4a) with (1a) and (2a) makes evident the equivalence of the least squares problem to the electrical network characteristics if, in all cases:

$$G_{po} = d_{po}$$

$$G_{pq} = d_{pq}$$

and $$I_p = -\left(Y_{po} + \sum_q Y_{pq}\right)$$

Then, evidently, $$S_{po} = V_{po}$$
$$S_{pq} = V_{pq}$$

so that measurement of potentials between junctions of the electrical network analog will give the corresponding specific corrections of the survey net lines.

(It may be noted that in the foregoing unit ratios of correspondence between values have been assumed for simplicity; obviously, any suitable proportionality constants may be adapted as may be most convenient. Due account of the signs of quantities must, of course, be taken.)

Figure 3:
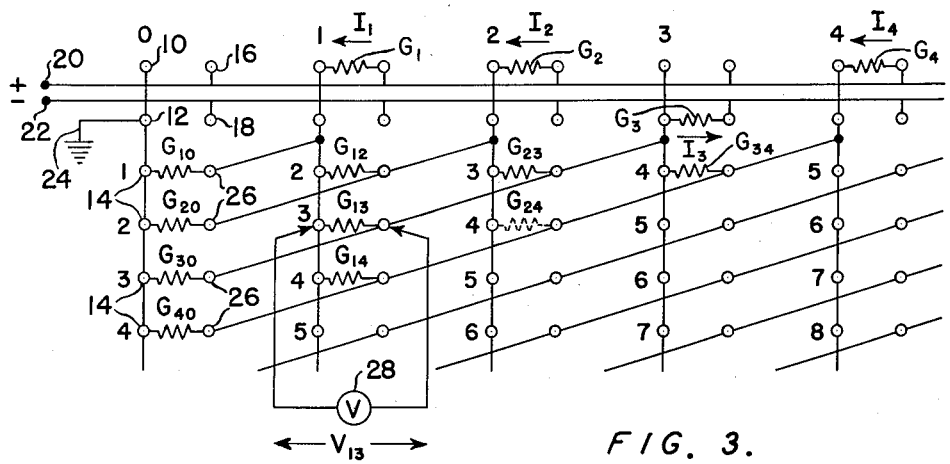
Figure 3 is a wiring diagram showing a typical type of apparatus for the analysis of an electrical network such as illustrated in Figure 2.

The actual setting up of a resistance network of the type illustrated in Figure 2 and measurements thereof may be most conveniently accomplished by the use of a board containing jacks as illustrated in Figure 3 with the jacks interconnected as illustrated therein. These jacks may be arranged in columns which are marked as indicated in Figure 3 to correspond to the various junctions. The upper two left-hand jacks of each column such as indicated at 10 and 12 are adapted for the introduction of currents by bridging to them suitable resistances from jacks 16 and 18 which are connected respectively to supply lines indicated at 20 and 22, respectively positive and negative with respect to ground. In the case of the zero column this, however, is not done but grounding of the left-hand column of jacks in that case is effected as indicated at 24. The third and subsequent jacks of each column are indicated at 14 and are numbered to correspond with junctions other than that corresponding to the column in question. The right-hand jacks 26 of each column are connected to the left-hand jacks of other columns as indicated so that the horizontally paired jacks of all of the columns will correspond to the combination of any two junctions of the network.

The board may be made sufficiently extensive to permit the solution of the network problem for the most complex cases which may be expected to be encountered.

In setting up the board for operation the various pairs of jacks 14 and 26 which are involved in the problem are bridged by plugging in suitable conductances corresponding to the G's. Various of these are indicated in Figure 3 such as would be involved in setting up the network of Figure 2. (A conductance $G_{24}$ is indicated, for completeness of illustration, in Figure 3, but would be zero in the case of the net actually shown in Figure 1, there being no line common to meshes 2 and 4.) The practical advantage of using conductances will now be apparent. Conductances may be added up to secure any desired value corresponding to a length of line merely by being plugged in in parallel. It will be obvious that this is far more convenient than if resistances were used proportional to line lengths, since such resistances would require being placed in series. Through the use of conductances these may be arranged with paired plugs and may themselves carry jacks for the reception of similarly paired plugs of other conductances.

In the claims where references are made to conductances directly connected between pairs of junctions, it is to be understood that there are referred to, for each pair of junctions $p$ and $q$, only the conductance $G_{pq}$ connected directly between them and not involving a devious conductance path by way of one or more other junctions. This will be evident upon considering the expressions (3a) and (4a).

Following the arrangement of conductances as just described, suitable conductances such as $G_1$, $G_2$, $G_3$ and $G_4$ are plugged in across pairs of junctions 10 and 16 or 12 and 18 to connect the columns of jacks corresponding to the junctions to the current sources 20 and 22 for the purpose of supplying input currents to the junctions. Most conveniently there are used supply sources of regulated high voltage value at 20 and 22. By the use of input conductances of much lower values than the line conductances, it will be evident that definite values of input currents may be obtained merely by the use of proper series conductances. These also may be made up in sets so that by proper combinations any desired current values can be secured.

With currents flowing in the apparatus, potentials may be measured across the jacks by a voltmeter such as 28 to give the specific corrections which are required and which may be then tabulated. The total correction for any line may then be obtained merely by multiplying the specific correction by the length of the line.

It will be evident that the configuration described has the advantage that it is unnecessary to insert in the various lines regulated voltage supplies which are quite expensive and are required in large numbers in the case of any complex network. Instead, only two current sources need be supplied and these may be accurately regulated in known fashions.

While the same is conveniently done in the apparatus which has been described, it will be evident that it is unnecessary to supply currents simultaneously to all of the junction points though this might be at first glance indicated by the theory discussed above. Instead, as will be readily understood from considering the superposition theorem applicable to linear networks, the current may be supplied to only one junction at a time and measurements made corresponding to that current. Such measurements may then be made with other current introductions and the results may be algebraically summed to give results which would correspond to those obtained if all the currents were simultaneously applied. It will be evident that the invention may be applied in many other ways than that specifically described.

It is to be noted that the network measurements are used only to give corrections to closures and, accordingly, the corrections do not become merely minor parts of large quantities, i. e., differences of elevation, so that the requirements on the precision of the component parts of the model are greatly reduced for the same precision in the results. It will accordingly be evident that the junction differences of elevation obtained from one operation of the apparatus may be used, in an iterative fashion, as new approximate values for a second operation of the apparatus. Under such circumstances, the corrections ascertained will be quite small and, consequently, the potential scale of the reading voltmeter may be correspondingly increased with the result that the corrections may be still more accurately obtained. It will be evident that by a repetition of this procedure the corrections may be obtained to a high degree of accuracy, giving the corrections to whatever accuracy is required.

Figure 4:
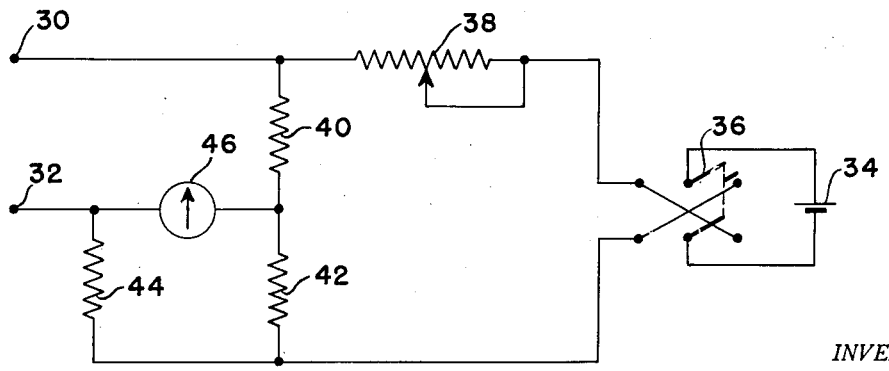
Figure 4 is a diagram illustrating how a negative resistance or conductance may be introduced into a network in the solution of a net problem involving interior bench marks.

Reference was made above to the problem of survey nets involving interior bench marks. It will be found that interior bench marks as described above will involve the necessity for a preliminary mathematical transformation and then for incorporating in the derived electrical network negative resistances or conductances, the other aspects of measurement being the same as already described. A negative resistance element may be provided, as illustrated in Figure 4, in which there is involved between terminals 30 and 32 an arrangement of a battery 34 connected to the blades of a double-pole, double-throw switch 36 which is in series with an adjustable resistance 38 and is connected through resistance 44 to the terminal 32. Equal resistances 40 and 42 are connected between terminal 30 and the end of resistance 44 remote from terminal 32. A galvanometer 46 is connected between the junction of resistances 40 and 42 and the terminal 32. When adjustment of resistance 38 is made so that the galvanometer 46 indicates zero current flow, there will appear between terminals 30 and 32, so far as the external circuit is concerned, a negative resistance having a magnitude equal to the actual resistance 44. The switch 36 is provided to secure the necessary null reading of galvanometer 46 irrespective of the polarities of external voltages. By providing one or more of such negative resistance elements where required in the array most interior bench mark problems may be solved. Actually, such problems are relatively infrequent.

What is claimed is:

1. A method for the least squares adjustment of a survey net comprising providing an electrical network having junctions corresponding to meshes of said net and having conductances directly connected between pairs of junctions proportional to the lengths of lines common to meshes of said net which correspond to the junctions of the respective pairs, introducing to said junctions, from sources external to the network, currents proportional to the closures of surveys about the meshes respectively corresponding to the junctions, and measuring potential differences between pairs of junctions.

2. A method for the least squares adjustment of a survey net comprising providing an electrical network having junctions corresponding to meshes of said net and having conductances directly connected between pairs of junctions inversely proportional to the weights ascribable to measurements along lines common to meshes of said net which correspond to the junctions of the respective pairs, introducing to said junctions, from sources external to the network, currents proportional to the closures of surveys about the meshes respectively corresponding to the junctions, and measuring potential differences between pairs of junctions.

No references cited.